(No Model.)
W. D. CUMMINGS.
WATER FILTER.
No. 350,917. Patented Oct. 19, 1886.
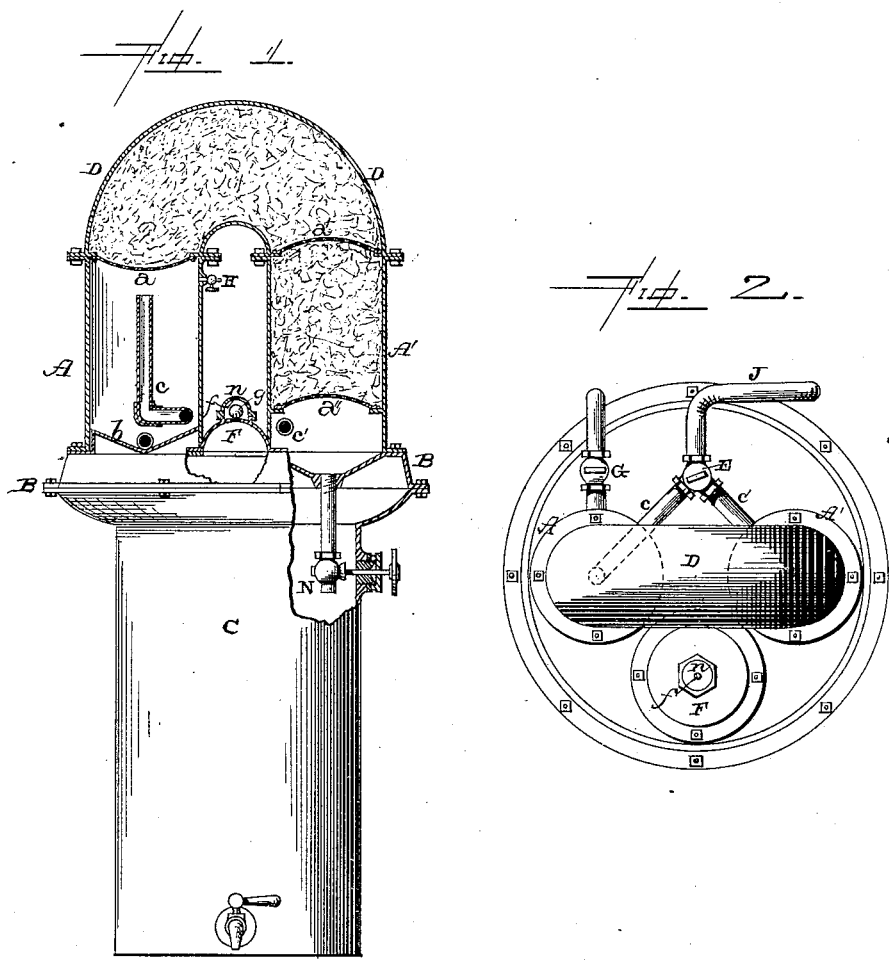
Witnesses.
R. F. Gardner
A. W. Brecht
Inventor
W. D. Cummings,
per F. A. Lehmann,
atty.

United States Patent Office.

WILLIAM D. CUMMINGS, OF PITTSBURG, PENNSYLVANIA.

WATER-FILTER.

SPECIFICATION forming part of Letters Patent No. 350,917, dated October 19, 1886.

Application filed February 25, 1886. Serial No. 193,151. (No model.)

*To all whom it may concern:*

Be it known that I, WILLIAM D. CUMMINGS, a citizen of the United States, residing at Pittsburg, in the county of Allegheny and State of Pennsylvania, have invented certain new and useful Improvements in Water-Filters; and I do hereby declare the following to be a full, clear, and exact description of the invention, such as will enable others skilled in the art to which it appertains to make and use the same.

My invention relates to an improvement in water-filters; and it consists in a device composed of two hollow cylinders, their upper ends connected by an arch, through which a communication between the cylinders is established. The arch and one of the cylinders are to be filled with the material employed for filtering the water. The remaining cylinder, separated from the arch by a perforated plate or sieve, serves for the reception of forcibly-introduced water, that, when the cylinder has become filled, passes through the perforated plate into the arch, thence downward through the second cylinder, and is discharged or drawn off at its bottom.

The object of my invention has been to obtain filtered water in large quantities, and to obviate the necessity of removing by hand the accumulating deposits of matter from the material used for filtering and from the bottom of the filter. This I effect by reversing the inflowing stream of water, by which the offensive substance is forced back to the cylinder through which it was first introduced, and is by force of the current expelled. The water to be filtered is introduced into the vacant cylinder through a connection with a hydrant or other source of flowing water. Thus the necessity of carrying water to the filter when empty is avoided.

The accompanying drawings represent my invention. Figure 1 represents an elevation and part section of the water-filter; Fig. 2, a plan view of the same.

A A' are hollow cylinders placed and secured on the cap B of the reservoir C, and made water-tight. The cylinders are provided at their upper edges with flanges, by which they are fastened to similar ones at the ends of a hollow arch, D, thus establishing a communication between the cylinders. At the fastening in the upper ends of the cylinders A A' are perforated plates or sieves $a$ $a'$, and near the bottom of the cylinder A' is another sieve, $a''$. The bottom of the cylinder A is a drain-plate, $b$, and an induction-pipe, $c$, with an elbow, is introduced above it. The outer end of the pipe $c$ meets a washout pipe, $c'$, from under the sieve $a''$ in the cylinder A', and both are united in a three-way cock, E, by which water can be introduced into either of the cylinders or cut off. The cock E is on a supply-pipe, J, that carries the water from the hydrant or other flowing stream.

F is a dome-shaped cap placed over an opening in the cap B, with a valve-seat, $n$, on top. In the bottom of the valve-seat is an opening, and another opening, $f$, in the top for air to enter when the water is discharging from the filter.

In the valve-seat $n$ is a ball, $g$, that, when the water enters through the bottom, is thereby lifted up and closes the air-hole $f$.

G is a stop-cock for the emission of water from cylinder A, and H for the admission of air into the same.

N is a discharge-cock into the reservoir C from the bottom of cylinder A'.

The arch D and the cylinder A' being filled with the material employed for filtering, the water to be filtered is introduced through the pipe $c$ into the cylinder A. When filled, the water rises through the perforated plate $a$ into the arch D, and, passing through the filtering material confined in it, flows down into the cylinder A', to be discharged through the cock N into the reservoir B. Having passed through, the water has become purified, and the stream may be continued for any length of time without interruption.

If it becomes necessary to cleanse the filter, or to remove the deposits of the filtered water from the filter, the three-way cock E is to be turned to admit water through the pipe $c'$ into the cylinder A', reversing its current and causing the water to flow back through the arch D into the cylinder A, from which it escapes through the cock G, carrying with it all the impurities that may have been deposited in the filter.

Having thus described my invention, I claim—

In a filter, the combination of the cylinders A A', arch D, pipes c J, provided with the cock E, dome F, provided with a valve, and the reservoir C, substantially as shown and described.

In testimony whereof I affix my signature in presence of two witnesses.

WILLIAM D. CUMMINGS.

Witnesses:
M. E. HARRISON,
T. F. LEHMANN.